US008600197B2

United States Patent
Oikawa et al.

(10) Patent No.: US 8,600,197 B2
(45) Date of Patent: Dec. 3, 2013

(54) OPTICAL CONTROL DEVICE

(75) Inventors: Satoshi Oikawa, Chiyoda-ku (JP); Junichiro Ichikawa, Chiyoda-ku (JP); Yuhki Kinpara, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 12/450,370

(22) PCT Filed: Mar. 28, 2008

(86) PCT No.: PCT/JP2008/056086
§ 371 (c)(1),
(2), (4) Date: Sep. 23, 2009

(87) PCT Pub. No.: WO2008/120718
PCT Pub. Date: Oct. 9, 2008

(65) Prior Publication Data
US 2010/0046880 A1 Feb. 25, 2010

(30) Foreign Application Priority Data
Mar. 30, 2007 (JP) .................. 2007-092750

(51) Int. Cl.
*G02F 1/035* (2006.01)
(52) U.S. Cl.
USPC ............... 385/2; 385/1; 385/3; 385/8
(58) Field of Classification Search
None
See application file for complete search history.

(56) References Cited

U.S. PATENT DOCUMENTS

| | | | |
|---|---|---|---|
| 4,685,763 A * | 8/1987 | Tada et al. ............... | 385/8 |
| 5,408,566 A | 4/1995 | Eda et al. | |
| 6,580,843 B2 | 6/2003 | Doi et al. | |
| 6,917,727 B2 * | 7/2005 | Gunn et al. ............... | 385/14 |
| 2002/0146190 A1 | 10/2002 | Doi et al. | |
| 2003/0138180 A1 | 7/2003 | Kondo et al. | |

(Continued)

FOREIGN PATENT DOCUMENTS

| EP | 1 315 021 A2 | 5/2003 |
|---|---|---|
| EP | 1 455 219 A1 | 9/2004 |

(Continued)

OTHER PUBLICATIONS

Oikawa et al., "Zero Chirp 40Gbps LiNbO$_3$ Optical Modulator Using Ferroelectric Polarization Reversal," *IEICE Technical Report*, vol. 105, No. 183, Jul. 8, 2005, pp. 19-23.

(Continued)

*Primary Examiner* — Uyen Chau N Le
*Assistant Examiner* — Chad Smith
(74) *Attorney, Agent, or Firm* — Oliff & Berridge, PLC

(57) ABSTRACT

In a light control element comprising a thin plate having a thickness of 10 [mu]m or less and exhibiting electro optic effect, an optical waveguide formed on the thin plate, and a control electrode for controlling light passing through the optical waveguide, the control electrode includes a first electrode and a second electrode so arranged as to sandwich the thin plate, and the first electrode has a coplanar electrode consisting of a first signal electrode and a ground electrode, while the second electrode has a second signal electrode. Modulation signals having mutually inverted amplitudes are inputted to the first signal electrode of the first electrode and the second signal electrode of the second electrode such that the modulation signals cooperate to apply an electric field to the optical waveguide.

15 Claims, 9 Drawing Sheets

(56) References Cited

U.S. PATENT DOCUMENTS

| | | |
|---|---|---|
| 2003/0147581 A1 | 8/2003 | Doi et al. |
| 2004/0264832 A1 | 12/2004 | Kondo et al. |
| 2006/0023288 A1 | 2/2006 | McBrien et al. |

FOREIGN PATENT DOCUMENTS

| | | | |
|---|---|---|---|
| JP | 57-044128 | * | 3/1982 |
| JP | A 64-18121 | | 1/1989 |
| JP | A 6-75256 | | 3/1994 |
| JP | A 6-289341 | | 10/1994 |
| JP | A 7-191352 | | 7/1995 |
| JP | 2003-215519 | | 7/2003 |
| JP | B2 3638300 | | 4/2005 |
| JP | 2006-243327 | * | 9/2006 |
| JP | A 2006-243327 | | 9/2006 |
| WO | WO 2005/069071 A1 | | 7/2005 |
| WO | WO 2007/114367 A1 | | 10/2007 |

OTHER PUBLICATIONS

Oikawa et al., "Zero Chirped Broadband-type Z-cut LiNbO$_3$ Optical Modulator Using by Domain-inversion structure," *Extended Abstracts—The 64$^{th}$ Autumn Meeting of the Japan Society of Applied Physics*, No. 3, Aug. 30, 2003, p. 1072.

Extended European Search Report issued in Application No. EP 08 73 9204 dated May 14, 2012.

* cited by examiner

OPTICAL CONTROL DEVICE

TECHNICAL FIELD

The present invention relates to an optical control device and, particularly, to an optical control device which includes a sheet-like substrate having an electro-optical effect and having a thickness of 10 μm or less, an optical waveguide formed in the sheet-like substrate, and a control electrode for controlling light which passes through the optical waveguide.

BACKGROUND ART

Conventionally, in the field of optical communication or optical measurement, various optical control devices such as a waveguide type optical modulator and a waveguide type optical switch where an optical waveguide and a control electrode are formed on a substrate having an electro-optical effect have become commercially available. Many of the optical control devices which are currently being used are configured to include an optical waveguide 2, a signal electrode 4 and a ground electrode 5 which are formed on an electro-optical crystal substrate 1 having a thickness of about 0.5 to 1 mm, as illustrated in FIG. 1. FIG. 1 illustrates an example of an optical modulator that uses a Z-cut $LiNbO_3$ substrate, in which reference numeral 3 indicates a buffer layer such as $SiO_2$ film.

Specifically, in the waveguide type optical modulator, a microwave signal is applied to the control electrode in order to control and modulate an optical wave propagating through the optical waveguide. Therefore, there is a need for achieving an impedance matching between the control electrode in the optical modulator and a signal path, such as a coaxial cable which introduces microwaves into the optical modulator, in order to allow the microwave to propagate effectively in the control electrode. For this reason, as illustrated in FIG. 1, a type of control electrode where a signal electrode 4 is interposed between ground electrodes 5 so that a so-called coplanar control electrode has been used.

However, in the case of the coplanar control electrode, since an external electric field does not operate efficiently in a direction (corresponding to a vertical direction in the case of the Z-cut $LiNbO_3$ substrate illustrated in FIG. 1) where efficiency of the electro-optical effect of the substrate 1 is high, a larger voltage is required in order to obtain a required optical modulation degree. Concretely, when a $LiNbO_3$ substrate is used and an electrode length along the optical waveguide is 1 cm, a half-wavelength voltage of about 10 to 15 V is required.

As illustrated in FIG. 2, Patent Document 1 discloses a configuration in which the optical waveguide is formed of a ridged waveguide 20, and the ground electrodes 5, 51, and 52 are disposed closer to the signal electrodes 4 and 41 in order to enhance an optical confinement factor of the optical waveguide and to more efficiently apply an electric field generated by the control electrode to the optical waveguide. According to this configuration, it is possible to realize a reduction in driving voltage to some degree but it is essential to reduce the driving voltage much more in order to realize a high-speed modulation in a high frequency band.

In addition, as illustrated in FIG. 3, Patent Document 2 discloses that the substrate is interposed between the control electrodes, and the electric field is applied in a direction (corresponding to a vertical direction in the case of the Z-cut $LiNbO_3$ substrate illustrated in FIG. 3) where the efficiency of the electro-optical effect is high. Moreover, the optical modulator illustrated in FIG. 3 polarizes reversely the substrate having the electro-optical effect, and forms substrate regions 10A and 10B in which the respective spontaneous polarization directions (the directions of arrows in FIG. 3) are different from each other, and the optical waveguide 2 is formed in each of the substrate regions. When the electric field is applied to each optical waveguide by the common signal electrode 42 and the ground electrode 53, it is possible to generate a phase change for each optical waveguide such that the phase change of one optical waveguide is different from that of another optical waveguide. Using this differential driving, it is possible to reduce the driving voltage much more.

However, in the electrode structure illustrated in FIG. 3, a refractive index of the microwave becomes high, and thus it is difficult to realize a velocity matching between the optical wave which is propagating through the optical waveguide and the microwave which is a modulation signal. Moreover, since the impedance is reduced to the contrary, there is a drawback in that it is difficult to achieve the impedance matching with the signal path of the microwave.

On the other hand, in the following Patent Document 3 or 4, the optical waveguide and a modulating electrode are formed integrally in a very thin substrate which has a thickness of 30 μm or less (the substrate will be referred to as a "sheet-like substrate," and another substrate which has a lower dielectric constant than that of the sheet-like substrate is bonded to the sheet-like substrate, thereby lowering an effective refractive index with respect to the microwave and achieving the velocity matching between the microwave and the optical wave.

However, even when the control electrode having the structure as illustrated in FIGS. 1 to 3 is formed in the optical modulator that uses such a sheet-like substrate, the above-mentioned problems still have fundamentally not been resolved. When the substrate is interposed between the control electrodes illustrated in FIG. 3, the refractive index of the microwave tends to decrease if the thickness of the substrate is thin, but it is difficult to realize the velocity matching between the optical wave and the microwave. Even when it depends on the width of the electrode, when a sheet-like substrate made of LN is used for example, the effective refractive index is about 5, which is far lower than an optimal value of 2.14. On the other hand, the impedance tends to decrease as the substrate becomes thinner, which causes a mismatching in impedance to be large.

Patent Document 1: U.S. Pat. No. 6,580,843
Patent Document 2: Japanese Patent No. 3638300
Patent Document 3: JP-A 64-018121 (KOKAI)
Patent Document 4: JP-A 2003-215519 (KOKAI)
Patent Document 5: JP-A 6-289341 (KOKAI)

DISCLOSURE OF THE INVENTION

Problems to be Solved by the Invention

The present invention is directed to solve such problems and an object of the present invention is to provide an optical control device capable not only of achieving a velocity matching between a microwave and an optical wave and an impedance matching of the microwave, but also achieving a reduction in driving voltage and providing excellent modulation efficiency.

Another object of the present invention is to provide the optical control device which can operate stably and suppress a rise in temperature of the optical control device owing to the reduction in driving voltage, and further to provide the optical control device which can use a low-driving-voltage driving device which is inexpensive.

Means for Solving the Problems

In order to solve the above-mentioned problems, according to the invention of claim 1, there is provided an optical control device including: a sheet-like substrate which has an electro-optical effect and has a thickness of 10 μm or less; an optical waveguide formed on the sheet-like substrate; and a control electrode for controlling light passing through the optical waveguide, wherein the control electrode is comprised of a first electrode and a second electrode which are arranged so as to interpose the sheet-like substrate so that the first electrode includes a coplanar electrode which is composed of at least a first signal electrode and a ground electrode and the second electrode includes at least a second signal electrode, wherein the first signal electrode of the first electrode and the second signal electrode of the second electrode are configured to receive modulation signals having opposite phases and apply an electric field to the optical waveguide in cooperation with each other. The term "having opposite phases" refers to a case where the signs of electric field are opposite and the amplitude ratio is constant.

The term "coplanar electrode" as used in the present invention means a configuration such that a signal electrode is interposed between ground electrodes. For example, the coplanar electrode includes a structure where the signal electrode and the ground electrode are arranged at equal intervals or different intervals, a structure where the ground electrode is disposed in the side of one side of the signal electrode, a structure where a plurality of signal electrodes is interposed between a pair of ground electrodes, and a structure where the ground electrodes are additionally disposed between the corresponding ones of a plurality of signal electrodes.

According to the invention of claim 2, the optical control device according to claim 1 is characterized in that the first signal electrode of the first electrode and the second signal electrode of the second electrode are arranged so that the optical waveguide is positioned between the first signal electrode and the second signal electrode.

According to the invention of claim 3, the optical control device according to claim 1 or 2 is characterized in that the second electrode includes a planar auxiliary electrode which is formed below the second signal electrode so as to be coupled with the second signal electrode.

According to the invention of claim 4, the optical control device according to any one of claims 1 to 3 is characterized in that the control electrode includes a third electrode which is maintained at the ground potential and formed to be located in a lower portion of the second electrode.

According to the invention of claim 5, the optical control device according to any one of claims 1 to 4 is characterized in that the optical waveguide is a ridged optical waveguide.

According to the invention of claim 6, the optical control device according to any one of claims 1 to 5 is characterized in that a buffer layer is formed at least between the sheet-like substrate and the first electrode.

According to the invention of claim 7, the optical control device according to any one of claims 1 to 5 is characterized in that in the first electrode and the second electrode, the signal electrode and the ground electrode are configured by either a transparent electrode or an electrode where a transparent electrode is disposed on the sheet-like substrate.

According to the invention of claim 8, the optical control device according to any one of claims 5 to 7 is characterized in that a low dielectric constant film is filled in recesses which are disposed on at least both sides of the ridged waveguide.

According to the invention of claim 9, the optical control device according to any one of claims 1 to 8 is characterized in that a spontaneous polarization of the sheet-like substrate including at least a portion of the optical waveguide is reversed.

Effects of the Invention

According to the invention of Claim 1, the optical control device includes the sheet-like substrate which has an electro-optical effect and has a thickness of 10 μm or less; the optical waveguide formed on the sheet-like substrate; and the control electrode for controlling light passing through the optical waveguide. The control electrode is comprised of a first electrode and a second electrode which are arranged so as to interpose the sheet-like substrate. The first electrode includes a coplanar electrode which is composed of at least a signal electrode and a ground electrode. The second electrode is configured to include at least a ground electrode so as to apply an electric field to the optical waveguide in cooperation with the signal electrode of the first electrode. Therefore, it is possible to provide an optical control device capable not only of achieving a velocity matching between the microwave and the optical wave and an impedance matching of the microwaves, but also operating at a high speed.

Moreover, the first signal electrodes of the first electrode and the second signal electrode of the second electrode are configured so as to receive modulation signals having opposite phases and apply an electric field to the optical waveguide in cooperation with each other. Therefore, it is possible to modulate the optical signals propagating through the optical waveguide more effectively and to increase the modulation efficiency. In other words, it is possible to provide an optical control device capable not only of achieving a velocity matching between the microwave and the optical wave and an impedance matching of the microwaves, but also achieving a reduction in driving voltage and performing modulation with high modulation efficiency. Moreover, it is possible to provide the optical control device which can operate stably and suppress a rise in temperature of the optical control device owing to the reduction in driving voltage, and further to provide the optical control device which can use a low-driving-voltage driving device which is inexpensive.

According to the invention of claim 2, since the first signal electrode of the first electrode and the second signal electrode of the second electrode are arranged so that the optical waveguide is positioned between the first signal electrode and the second signal electrode, it is possible to dispose the respective signal electrodes closer to the optical waveguide. Therefore, the optical waves propagating in the optical waveguide can be modulated with higher modulation efficiency. In other words, it is possible to perform modulation with sufficiently high modulation efficiency at a relatively low driving voltage. Moreover, it is possible to provide the optical control device which can operate stably and suppress a rise in temperature of the optical control device owing to the further reduction in driving voltage, and further to provide the optical control device which can use a low-driving-voltage driving device which is inexpensive.

According to the invention of claim 3, the second electrode includes a planar auxiliary electrode which is formed below the second signal electrode so as to be coupled with the second signal electrode. In this case, the second electrode can be formed as the combination of the second signal electrode and the auxiliary electrode which are integral with each other. Therefore, as will be described in detail, by placing the second electrode on the supporting substrate and subsequently forming the sheet-like substrate, the optical waveguide, the first electrode and the like, it is possible to obtain the same optical control device satisfying the positional relationship of the signal electrode and the optical waveguide, as defined in claims 1 or 2.

According to the invention of claim 4, since the control electrode includes a third electrode which is maintained at the ground potential and formed so as to be located in a lower portion of the second electrode, it is possible to control the impedance of the second signal electrode of the second electrode or the refractive index of the microwave. Preferably, by appropriately adjusting the thickness of the third electrode or the width, the thickness and the like of the second signal electrode of the second electrode, it is possible to make the impedance of the second electrode (and the third electrode) and the refractive index of the microwave substantially identical to the impedance of the first electrode and the refractive index of the microwave. Therefore, by only inputting modulation signals of opposite phase under the same amplitude to the first signal electrode of the first electrode and the second signal electrode of the second electrode, it is possible to modulate the optical wave propagating through the optical waveguide with about twice modulation efficiency.

According to the invention of claim 5, since the optical waveguide is the ridged optical waveguide, an optical confinement factor becomes higher and it is possible to concentrate an electric field generated by the control electrode into the optical waveguide. Therefore, it is possible to realize the optical control device which operates in a lower driving voltage.

According to the invention of claim 6, since the buffer layer is formed at least between the sheet-like substrate and the first electrode, it is possible to dispose the control electrode much closer to the optical waveguide while suppressing a propagation loss of the optical wave propagating through the optical waveguide.

According to the invention of claim 7, since the signal electrode and the ground electrode are configured by either a transparent electrode or an electrode where a transparent electrode is disposed on the sheet-like substrate, it is possible to dispose the control electrode further closer to the optical waveguide while suppressing a propagation loss of the optical wave propagating through the optical waveguide, even when there is no buffer layer.

According to the invention of claim 8, since the low dielectric constant film is filled in recesses which are disposed on at least both sides of the ridged waveguide, it is possible to adjust the refractive index or the impedance of a microwave in the control electrode, and thus a further appropriate refractive index or impedance of the microwave can be obtained.

According to the invention of claim 9, a spontaneous polarization of the sheet-like substrate including at least a portion of the optical waveguide is reversed in the optical control device according to any one of claims 1 to 10. Therefore, a differential driving of the optical control device easily can be realized by a simple control electrode or a driving circuit, and thus it is possible to reduce a driving voltage.

BEST MODE FOR IMPLEMENTING THE INVENTION

Figure 1:
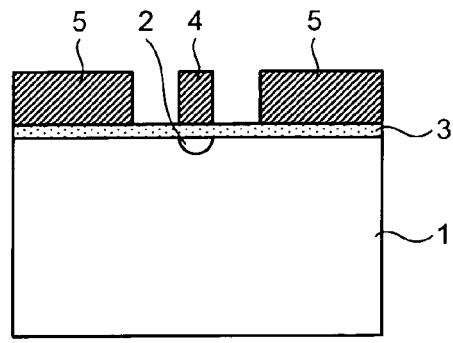
FIG. 1 is a view illustrating an example of a conventional optical control device.
Figure 2:
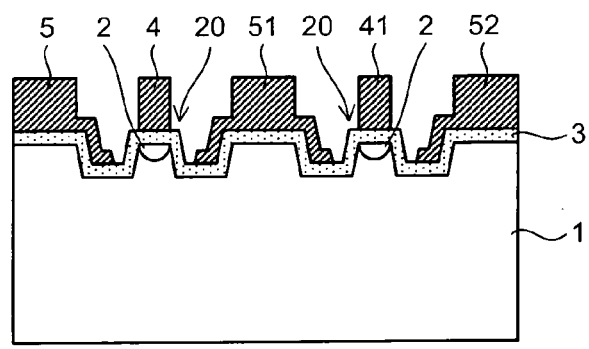
FIG. 2 is a view illustrating an example of the conventional optical control device.
Figure 3:
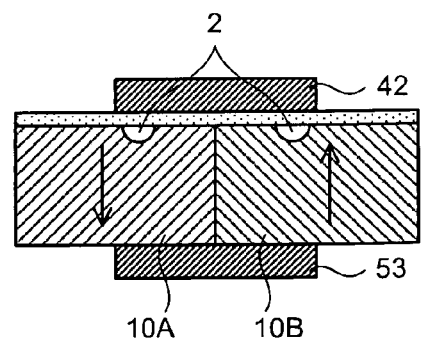
FIG. 3 is a view illustrating an example of the conventional optical control device.
Figure 4:
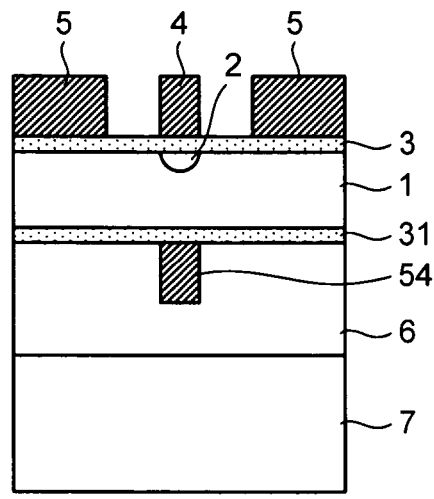
FIG. 4 is a view illustrating an example of an optical control device according to the present invention.

FIG. 4 is a cross sectional view illustrating an example of an optical control device according to the present invention. In this example, a case where a sheet-like substrate on which an optical waveguide is to be formed is configured by a Z-cut LiNbO$_3$ substrate is illustrated, and only a main part of the optical control device is illustrated.

As illustrated in FIG. 4, an optical waveguide 2 is formed in a Z-cut substrate (sheet-like substrate 1) such that control electrodes are disposed so as to interpose the sheet-like substrate 1 therebetween. The control electrodes include a first electrode which is disposed on an upper side of the sheet-like substrate 1 and a second electrode which is disposed on a lower side of the sheet-like substrate 1. The first electrode includes a signal electrode 4 (first signal electrode) and a ground electrode 5, and the second electrode includes a signal electrode 54 (second signal electrode). It goes without saying that the first and second electrodes may appropriately include additional necessary electrodes such as a DC electrode other than the illustrated electrodes. Moreover, as the optical waveguide, a straight waveguide or a Mach-Zehnder type optical waveguide incorporating therein a straight waveguide may be used.

The optical control device illustrated in FIG. 4 is characterized in that not only an electric field through the signal electrode 4 and the ground electrode 5, but also an electric field through the signal electrodes 4 and 54 are applied to the optical waveguide 2. That is to say, by inputting modulation signals of opposite phases under the same amplitude to these signal electrodes, the electric field (modulation) from the signal electrode 4 and the electric field (modulation) from the signal electrode 54 can be simultaneously applied under substantially the same phase to the optical wave progagating in the optical waveguide 2. Therefore, it is possible to modulate the optical wave with higher efficiency. When the modulation signals are sinusoidal wave of signal frequency, by reversing the phase difference between the signal electrode 4 and the signal electrode 54, modulation can be performed on the optical waveguide 2 with high efficiency.

Moreover, in this example, since the thickness of the sheet-like substrate 1 is as extremely small as 10 μm or less, it is possible to increase the intensity of the vertical electric field to the optical waveguide 2 and thus to reduce the driving voltage. Moreover, since the refractive index and the impedance of a microwave in the control electrode is determined by the signal electrodes 4 and 54 and the ground electrode 5, it is possible to set the impedance value to 50Ω while realizing a refractive index of 2.14 that is an optimal value for the microwave, for example.

Furthermore, in this example, since the optical waveguide 2 is positioned between the signal electrodes 4 and 54, the signal electrodes 4 and 54 are positioned closer to the optical waveguide 2. Therefore, a higher electric field can be applied from the signal electrodes 4 and 54 to the optical waveguide 2, and thus it is possible further to reduce the driving voltage and perform modulation with higher efficiency.

The first electrode is disposed via a buffer layer 3 such as a $SiO_2$ film which is disposed between the first electrode and the sheet-like substrate 1. The buffer layer has an effect that prevents an optical waves propagating in the optical waveguide from being absorbed or scattered by the control electrode. In addition, as a configuration of the buffer layer, a Si film or the like also can be formed integrally if necessary in order to reduce the pyroelectric effect of the sheet-like substrate 1.

Moreover, the second electrode (the signal electrode 54) is disposed on the sheet-like substrate 1 via a low refractive index layer 31 which has a width larger than that of the signal electrode 4 of the first electrode and is formed over the entire length of the signal electrode 4. Therefore, it is possible to reduce an electrode loss and to increase an optical confinement factor. Accordingly, it is possible to realize a highly efficient modulator capable of coping with a high frequency band.

In other words, according to the optical control device of the present embodiment, it is possible to provide an optical control device capable not only of achieving a velocity matching between the microwave and the optical wave and an impedance matching of the microwaves, but also achieving a reduction in driving voltage and providing excellent modulation efficiency. Moreover, it is possible to provide the optical control device which can operate stably and suppress a rise in temperature of the optical control device owing to the reduction in driving voltage, and further to provide the optical control device which can use a low-driving-voltage driving device which is inexpensive.

In the present embodiment, the thickness of the sheet-like substrate 1 is 10 μm or less so that not only the electric field through the signal electrode 4 and the ground electrode 5, but also the electric field through the signal electrode 4 and the signal electrode 54 sufficiently can be applied to the optical waveguide 2. Although the lower limit of the thickness of the sheet-like substrate 1 is not limited, the thickness is set to 0.7 μm, for example. If the sheet-like substrate is thinner than 0.7 μm, it is difficult to form the optical waveguide 2 having a sufficient size.

The sheet-like substrate 1 is bonded to the supporting substrate 7 via an adhesive layer 6 after the second electrode is formed. In this case, even when the thickness of the sheet-like substrate 1 is 10 μm or less, it is possible to secure a sufficient mechanical strength for the optical control device.

Figure 5:
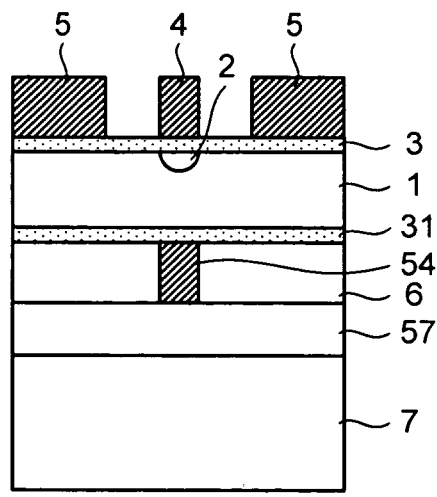
FIG. 5 is a view illustrating an example of an optical control device according to the present invention.

FIG. 5 is a cross-sectional view illustrating a modified example of the optical control device illustrated in FIG. 4. In this example, the second electrode includes a planar auxiliary electrode 57 which is formed below the signal electrode 54 so as to be coupled with the signal electrode 54. In this case, the second electrode can be formed as the combination of the signal electrode 54 and the auxiliary electrode 57 which are integral with each other. Therefore, as illustrated in FIG. 5, by placing the second electrode on the supporting substrate 7 and subsequently forming the sheet-like substrate 1, the optical waveguide 2, the first electrodes 4, 5 and the like, the optical waveguide 2 can be positioned between the signal electrodes 4 and 54. Thus, according to this example, it is possible to obtain an optical control device having the above-mentioned operational effects by a simple forming process.

Figure 6:
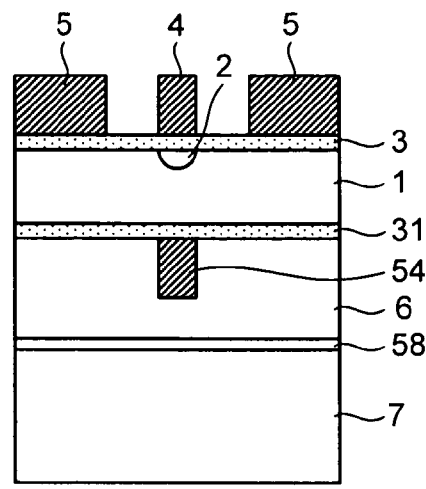
FIG. 6 is a view illustrating a modified example of the optical control device illustrated in FIG. 4.

FIG. 6 is a cross sectional view illustrating another modified example of the optical control device illustrated in FIG. 4. In this example, a third electrode 58 which is maintained at the ground potential is formed in the lower portion of the signal electrode 54 as the second electrode via the adhesive layer 6. Therefore, it is possible to control the impedance of the signal electrode 54 or the refractive index of the microwave. Preferably, by appropriately adjusting the distance between the second electrode 54 and the third electrode 58 or the width, the thickness and the like of the signal electrode 54, it is possible to make the impedance of the signal electrode 54 (and the third electrode 58) and the refractive index of the microwave substantially identical to the impedance of the first electrodes 4 and 5 and the refractive index of the microwave. Therefore, by only inputting modulation signals of opposite phases under the same amplitude to the signal electrode 4 of the first electrode and the signal electrode 54 of the second electrode, it is possible to modulate the optical wave propagating through the optical waveguide with about twice modulation efficiency.

As a crystalline substrate having an electro-optical effect used for the sheet-like substrate, lithium niobate, lithium tantalite, PLZT (lead lanthanum zirconate titanate), or quartz-based material, or a combination of these materials can be used, for example. It is particularly preferable to use crystals of lithium niobate (LN) or lithium tantalite (LT) due to their high electro-optical effect.

As a method of manufacturing the optical waveguide, it is possible to form the optical waveguide by diffusing Ti or the like into a substrate surface through a thermal diffusion method or a proton-exchange method. In addition, as described in Patent Document 5, it is possible to form the optical waveguide by forming a ridge structure on the surface of the sheet-like substrate 1 in accordance with the shape of the optical waveguide.

The control electrode such as the signal electrode or the ground electrode can be formed through the formation of an electrode pattern of Ti/Au and a plated gold film, etc. In addition, for a transparent electrode to be described later, ITO or a compound oxide film of In and Ti which is an infrared-transparent conductive film is available. Further, the transparent electrode can be formed through the formation of the electrode pattern using photolithography technique and then using lift-off technique, or the formation of the electrode pattern using a mask member commensurate with the shape of the electrode pattern using dry etching or wet etching (see Patent Document 5).

In a method of manufacturing the sheet-like substrate 1 including the optical control device, the above-mentioned optical waveguide is formed on a substrate having a thickness of several hundreds μm, and a rear surface of the substrate is polished, so that the sheet-like substrate having a thickness of 10 μm or less is prepared. Thereafter, a control electrode is formed on a top surface of the sheet-like substrate. Alternatively, it is also possible to polish the rear surface of the substrate after forming the optical waveguide, the control electrode and the like. There may be a risk of damage to the sheet-like substrate when the sheet-like substrate undergoes a thermal impact during the formation of the optical waveguide or a mechanical impact due to handling of the sheet-like film during various processes. Therefore, it is preferable that a process that is likely to involve these thermal or mechanical impacts is performed before the substrate is polished to obtain the sheet-like substrate.

Various materials can be used for the supporting substrate 7. For example, in addition to using the same material as the sheet-like substrate, it is possible to use materials having a lower dielectric constant than the sheet-like substrate, such as quartz, glass, or alumina, or materials having a different crystal orientation from the sheet-like substrate. However, in order to stabilize the modulation characteristics of the optical control device with respect to temperature variation, it is preferable to select and use materials having a linear expansion coefficient equivalent to that of the sheet-like substrate. To the contrary, in a case where it is difficult to select the equivalent material, a material having a linear expansion coefficient equivalent to that of the sheet-like substrate is selected and used for an adhesive for bonding the sheet-like substrate and the supporting substrate.

Hereinafter, applications of the optical control device according to the present invention will be described. In the following drawings, when the same members as the above-mentioned members are used, they are referenced by the same reference numeral as possible, and the adhesive layer or the supporting substrate is omitted, as necessary, in order to describe characteristics of the configuration clearly. Moreover, in order to prevent the description from becoming redundant, the applications of the embodiments illustrated in FIG. 4 will be described.

(Optical Control Device Using Ridged Waveguide)

Figure 7:
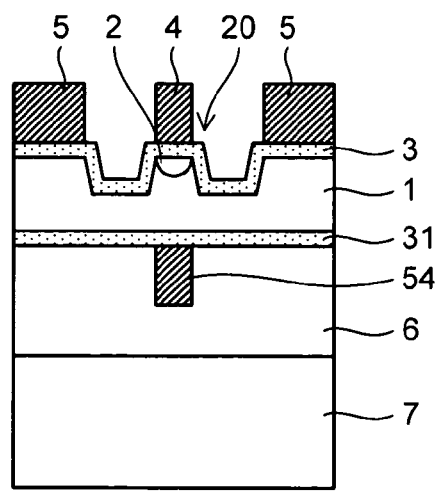
FIG. 7 is a view illustrating an example of a ridge-type optical control device according to the present invention.
Figure 8:
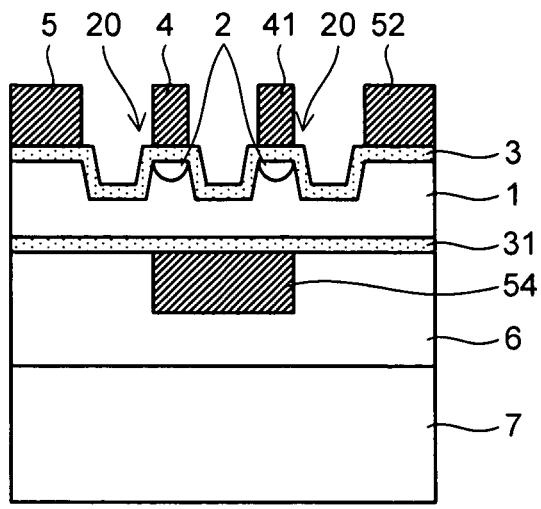
FIG. 8 is a view illustrating an example of a ridge-type optical control device according to the present invention.
Figure 9:
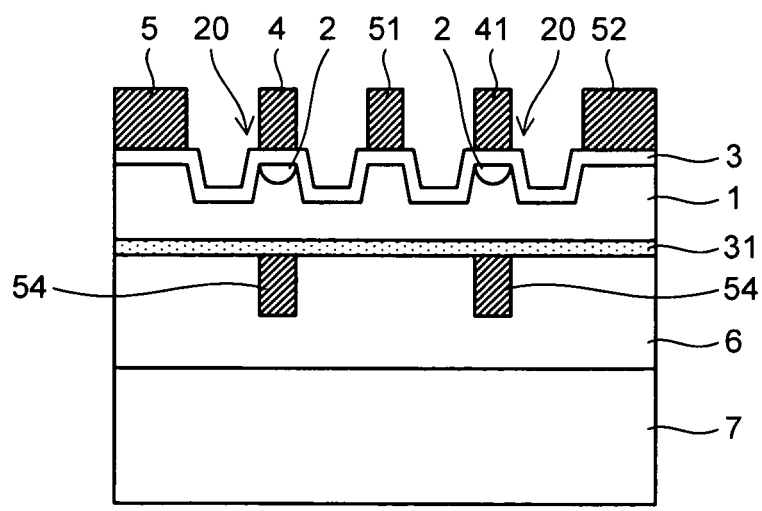
FIG. 9 is a view illustrating an example of a ridge-type optical control device according to the present invention.

FIGS. 7 to 9 illustrate an application of the optical control device illustrated in FIG. 4, which is an example of where the optical waveguide is formed by a ridged waveguide. Since the optical waveguide is formed as the ridged optical waveguide, an optical confinement factor becomes higher and it is possible to concentrate an electric field generated by the control electrode into the optical waveguide. Therefore, it is possible to realize the optical control device which operates in a lower driving voltage.

As illustrated in FIG. 7, the optical waveguide of the optical control device is formed as a ridged waveguide 20, whereby the optical wave propagating in the optical waveguide is confined in the ridge portion 20. Since the electric field generated by the signal electrode 4 and the ground electrode 5 and the electric field generated by the signal electrodes 4 and 54 are intensively applied to the ridge portion 20, it contributes to a reduction in driving transmission of the optical control device.

FIG. 8 illustrates that two optical waveguides 2 are formed as ridged waveguides 20. The signal electrodes 4 and 41 are disposed so as to correspond to the ridged waveguides, and signals of opposite directions are applied to the signal electrodes. For example, when an attention is paid to the left ridge portion 20, the electric field generated by the signal electrode 4 and the ground electrode 5, the electric field generated by the signal electrodes 4 and 54, and further the electric field generated by the signal electrode 4 and the signal electrode 41 are intensively applied to the left ridge portion 20.

FIG. 9 illustrates that two optical waveguides 2 are formed as the ridged waveguides 20, and a ridge portion corresponding to the ground electrode 51 is formed between the two optical waveguides. The signal electrodes 4 and 41 are disposed so as to correspond to the ridged waveguides 20, and independent signals are applied to the signal electrodes, respectively.

For example, when an attention is paid to the left ridge portion 20, the electric field generated by the signal electrode 4 and the ground electrode 5, the electric field generated by the signal electrodes 4 and 54, and further the electric field generated by the signal electrode 4 and the ground electrode 51 are intensively applied to the left ridge portion 20.

(Optical Control Device Having Low Dielectric Constant Film)

Figure 10:
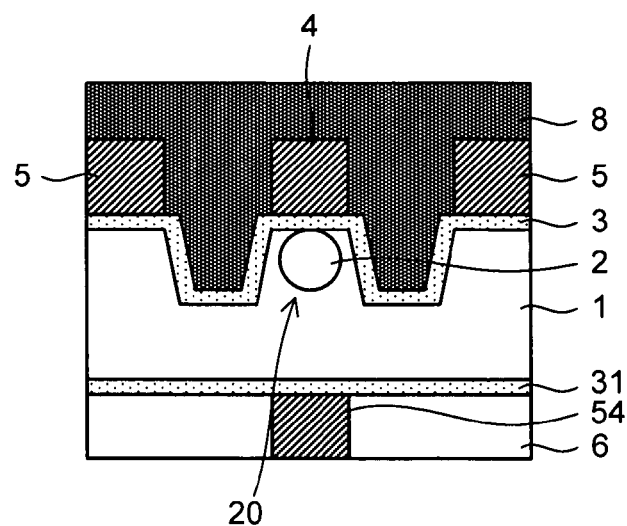
FIG. 10 is a view illustrating an example of an optical control device having a low dielectric constant film.
Figure 11:
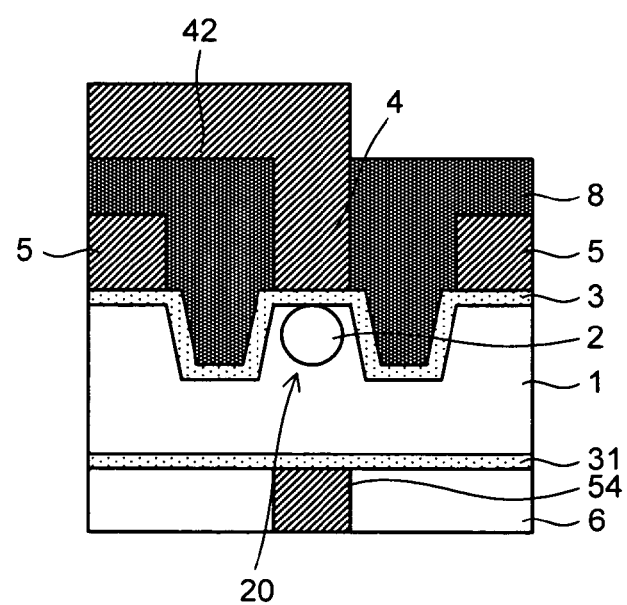
FIG. 11 is a view illustrating an example of an optical control device having a low dielectric constant film.

FIGS. 10 and 11 illustrate another application of the optical control device illustrated in FIG. 4, which is an example of where a low dielectric constant film is disposed in a recess that forms the ridged waveguide and between the signal electrode 4 and the ground electrode 5 which constitute the first electrode. With this arrangement of the low dielectric constant film, it is possible to adjust the refractive index or the impedance of a microwave in the control electrode, and to increase the degree of flexibility in wiring of the control electrode.

As materials of the low dielectric constant film, benzocyclobutene (BCB) or the like can be used, and as a method of manufacturing the low dielectric constant film, a coating method can be used.

As illustrated in FIG. 10, a low dielectric constant film 8 can be formed so as to cover recesses formed on both sides of the ridged waveguide 20, portions between the signal electrode 4 and the ground electrode 5, or the first electrode.

In addition, as illustrated in FIG. 11, a power feeding portion 42 of the signal electrode 4 is disposed across a portion of the ground electrode 5, and the low dielectric constant film 8 is disposed between the signal electrode 4 and the power feeding portion 42. Therefore, the control electrode can be wired in three dimensions, and thus the degree of flexibility in wiring design related to the control electrode can be increased. Moreover, the ground electrode may be formed so as to pass through a position above the signal electrode (location away from the sheet-like substrate).

(Optical Control Device where Optical Waveguide is Formed on Rear Surface Side of the Sheet-Like Substrate)

Figure 12:
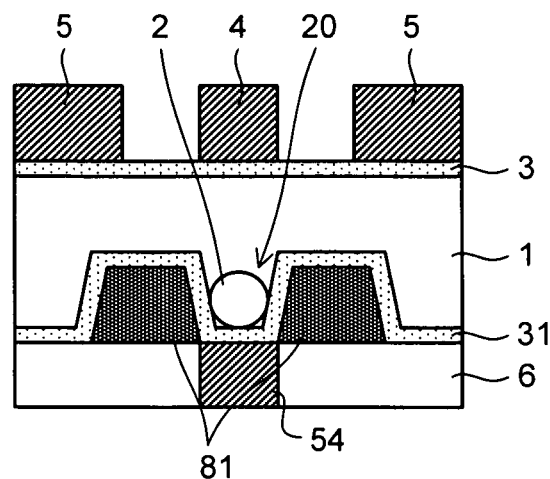
FIG. 12 is a view illustrating an example of an optical control device where an optical waveguide is formed on a rear surface side of a sheet-like substrate.
Figure 13:
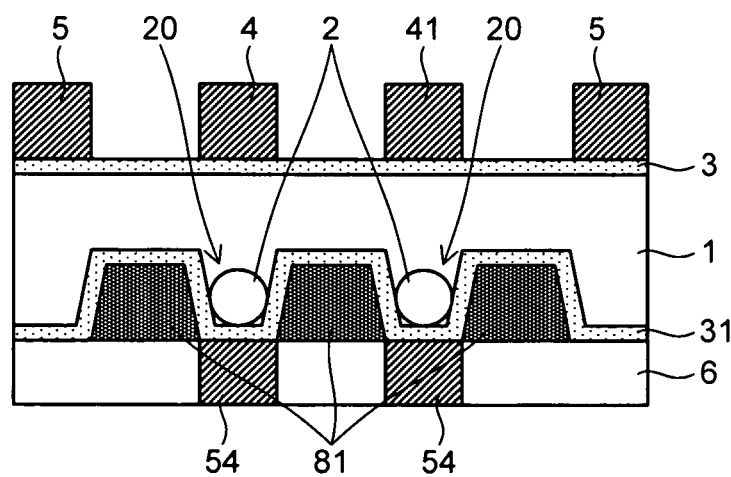
FIG. 13 is a view illustrating an example of an optical control device where an optical waveguide is formed on a rear surface side of a sheet-like substrate.

FIGS. 12 and 13 illustrate a further application of the optical control device illustrated in FIG. 4, which is an example of where the optical waveguide 2 (the ridged waveguide 20) is formed on the rear surface (the lower side in the drawing) of the sheet-like substrate 1. When the sheet-like substrate having a thickness of 10 μm or less is used, as illustrated in FIG. 12, the optical waveguide 2 is formed on the rear surface of the sheet-like substrate 1, and the signal electrode 4 and the ground electrode 5, which are the first electrode, are formed on the top surface of the sheet-like substrate. Further, even though the signal electrode 54, which is the second electrode, is formed on the rear surface of the sheet-like substrate 1, it is possible to apply an electric field, especially, the electric field generated by the signal electrode 4 and the signal electrode 54, to the ridge portion 20.

FIG. 13 illustrates an example of where two signal electrodes 4 and 41 are used, in which the left ridge portion 20 is applied with the electric field generated by the signal electrodes 4 and 54, and the right ridge portion 20 is applied with the electric field generated by the signal electrode 41 and the signal electrode 54.

In addition, a low dielectric constant film 81 may be formed in the recesses which form the ridge portions 20, if necessary.

In the case of the optical control device illustrated in FIGS. 7 to 9, it is necessary accurately to arrange the signal electrode 4 or 41 on the top of the ridge portion of the ridged waveguide. However, in the case of the optical control device illustrated in FIGS. 12 and 13, it is possible to provide an advantage that the electric field can be effectively applied to the ridge portion only by setting the width of the signal electrode 4 or 41 to be equal to or larger than that of the ridged waveguide, even when a small positional deviation occurs between them.

(Optical Control Device Using Transparent Electrode)

Figure 14:
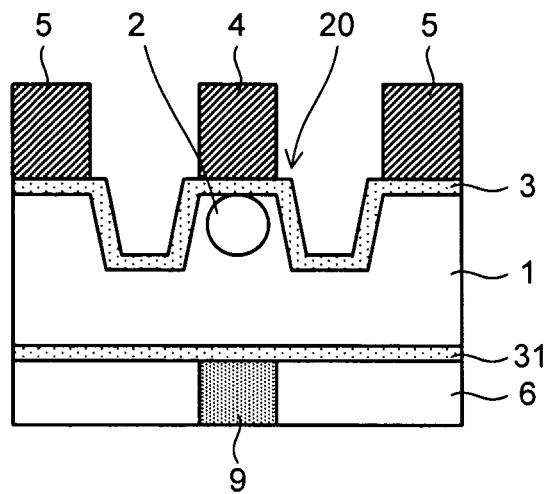
FIG. 14 is a view illustrating an example of an optical control device that uses a transparent electrode.
Figure 15:
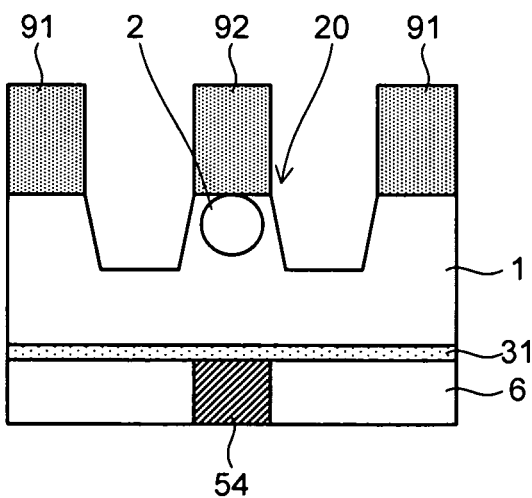
FIG. 15 is a view illustrating an example of an optical control device that uses a transparent electrode.
Figure 16:
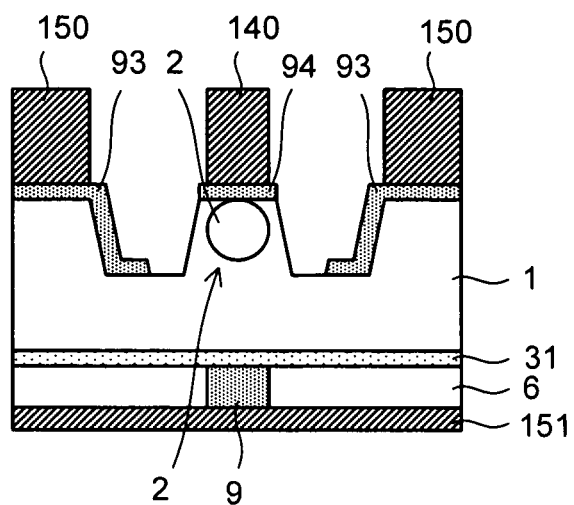
FIG. 16 is a view illustrating an example of an optical control device that uses a transparent electrode.

FIGS. 14 to 16 illustrate a still further application of the optical control device illustrated in FIG. 4, which is an example of where transparent electrodes 9 and 91 to 94 are used as the electrode. By using either a transparent electrode or an electrode where a transparent electrode is disposed on the sheet-like substrate as the signal electrode or the ground electrode, it is possible to dispose the control electrode much closer to the optical waveguide and to reduce the driving voltage while suppressing a propagation loss of the optical wave propagating through the optical waveguide, even when there is no buffer layer.

FIG. 14 illustrates an example of where a transparent electrode 9 is used as the signal electrode of the second electrode, and FIG. 15 illustrates an example of where transparent electrodes 91 and 92 are used as the first electrode. In these cases, a buffer layer 3 illustrated in FIG. 14 is not necessary, and it is possible to dispose the electrode closer to the optical waveguide. In addition, the ground electrode (the transparent electrode 91) constituting the first electrode illustrated in FIG. 15 may be formed by a general metal electrode because there is no optical waveguide in the vicinity of the electrode.

FIG. 16 illustrates an example of where the transparent electrode is used in a part (a side being in contact with the sheet-like substrate 1 or 11) of the control electrode. In general, since the transparent electrode has a high electrical resistivity compared to the metal electrode of Au or the like, it is possible to dispose the metal electrodes 140, 150, and 151 so as to be in contact with the transparent electrodes 9 or 93 to 96 for the purpose of reducing an electrical resistance of an electrode. In addition, it is also possible to dispose the transparent electrode close to the ridged waveguide or on a side surface of the ridged optical waveguide as illustrated by reference numeral 93 or 95 and 96, and to allow the electric field to act on the waveguide extremely effectively.

FIG. 16 illustrates an example of where a Z-cut LiNbO$_3$ substrate is used as the sheet-like substrate.

(Optical Control Device Using Polarization Reversal)

Figure 17:
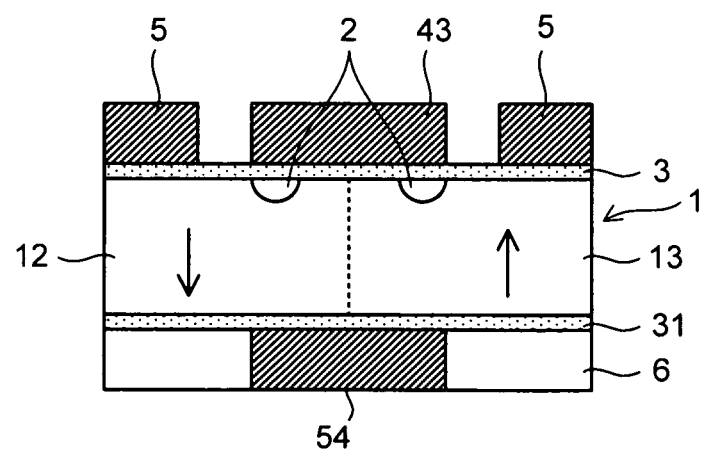
FIG. 17 is a view illustrating an example of an optical control device that uses a polarization reversal.
Figure 18:
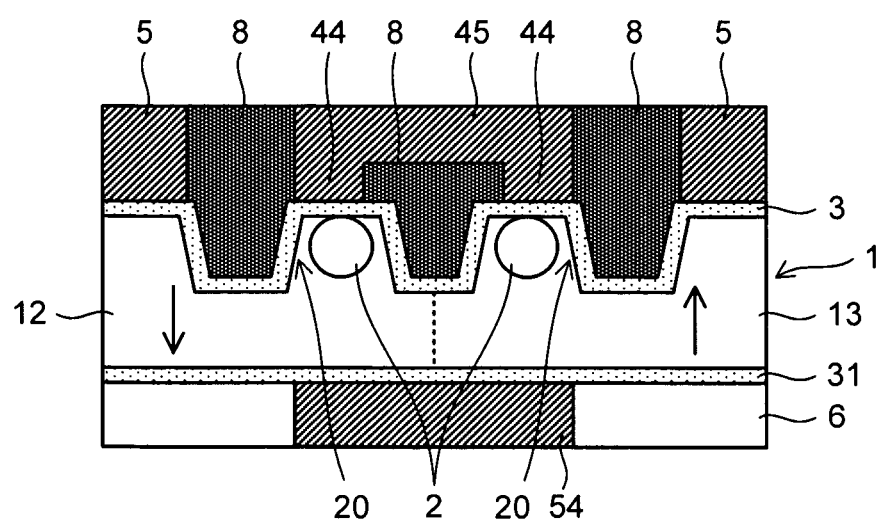
FIG. 18 is a view illustrating an example of an optical control device that uses a polarization reversal.

FIGS. 17 and 18 illustrate a further application of the optical control device illustrated in FIG. 4, which is an example of where the sheet-like substrate 1 is polarized reversely. Since the spontaneous polarization of the sheet-like substrate 1 including at least a portion of the optical waveguide is reversed, a differential driving of the optical control device can easily be realized by a simple control electrode or a driving circuit, and thus it is also possible to reduce a driving voltage.

In FIG. 17, the spontaneous polarizations are generated in substrate regions 12 and 13 of the sheet-like substrate 1 (indicated by arrows in the drawing) so that the polarization direction of the region 12 is opposite to the polarization direction of the region 13. The signal electrode 43 constituting the first electrode is able to apply a common electric field to the optical waveguides 2 which are formed in the substrate regions 12 and 13. Since the directions of polarization in the substrates are different from each other in the respective optical waveguides, a phase change of the optical wave propagating in the respective optical waveguides is reversed each other and, as a result, it is possible to obtain the same effect as that in the differential driving.

FIG. 18 illustrates an example of where the directions of polarization in the substrate regions 12 and 13 of the sheet-like substrate 1 are adjusted to be different, and a ridged optical waveguide is used. The same signal electrodes 44 are used for applying the electric field to the two ridged waveguides 20, and the two signal electrodes 44 are electrically connected by a connection path 45. Moreover, the low dielectric constant film 8 is formed on the recesses that form the ridged waveguides or between the signal electrode and the ground electrode 5.

INDUSTRIAL APPLICABILITY

According to the optical control device of the present invention, it is possible to provide an optical control device capable not only of achieving a velocity matching between the microwave and the optical wave and an impedance matching of the microwaves, but also achieving a reduction in driving voltage and providing high modulation efficiency. Moreover, it is possible to provide the optical control device which can operate stably and suppress a rise in temperature of the optical control device owing to the reduction in driving voltage, and further to provide the optical control device which can use a low-driving-voltage driving device which is inexpensive.

The invention claimed is:

1. An optical control device, comprising:
    a substrate which has an electro-optical effect and has a thickness of 10 μm or less;
    an optical waveguide formed on the substrate; and
    a control electrode for controlling light passing through the optical waveguide, wherein:
        the control electrode comprises:
            a first electrode including a coplanar electrode which is composed of at least a first signal electrode and a ground electrode; and
            a second electrode including at least a second signal electrode;
        the substrate is interposed between the first electrode and the second electrode,
        the first signal electrode of the first electrode and the second signal electrode of the second electrode receive modulation signals, in which the signs of respective electric fields relating to the modulation signals are opposite each other while the amplitude ratio of the respective electric fields is constant, and
        the respective electric fields are applied to the optical waveguide simultaneously, one of the respective electric fields having originated from the first signal electrode and the ground electrode of the first electrode and the other of the respective electric fields having originated from the first signal electrode and the second electrode.

2. The optical control device according to claim 1, wherein the first signal electrode of the first electrode and the second signal electrode of the second electrode are arranged so that the optical waveguide is positioned between the first signal electrode and the second signal electrode.

3. The optical control device according to claim 1,
wherein the second electrode includes a planar auxiliary electrode which is formed below the second signal electrode so as to be coupled with the second signal electrode.

4. The optical control device according to claim 1,
wherein the control electrode includes a third electrode which is maintained at a ground potential and formed to be located in a lower portion of the second electrode.

5. The optical control device according to claim 1,
wherein a buffer layer is formed at least between the substrate and the first electrode.

6. The optical control device according to claim 1,
wherein in the first electrode and the second electrode, the signal electrode and the ground electrode are configured by either a transparent electrode or an electrode where a transparent electrode is disposed on the substrate.

7. The optical control device according to claim 1,
wherein a spontaneous polarization of the substrate including at least a portion of the optical waveguide is reversed.

8. An optical control device comprising:
a substrate which has an electro-optical effect and has a thickness of 10 μm or less;
an optical waveguide formed on the substrate; and configured as a ridged optical waveguide,
a control electrode for controlling light passing through the optical waveguide, wherein:
the control electrode comprises:
a first electrode including a coplanar electrode which is composed of at least a first signal electrode and a ground electrode; and
a second electrode including at least a second signal electrode;
the substrate is interposed between the first electrode and the second electrode,
first signal electrode of the first electrode and the second signal electrode of the second electrode receive modulation signals, in which the signs of respective electric fields relating to the modulation signals are opposite each other while the amplitude ratio of the respective electric fields is constant, and the respective electric fields are applied to the optical waveguide simultaneously, one of the respective electric fields having originated from the first signal electrode and the ground electrode of the first electrode and the other of the respective electric fields having originated from the first signal electrode and the second electrode.

9. The optical control device according to claim 8,
wherein the first signal electrode of the first electrode and the second signal electrode of the second electrode are arranged so that the optical waveguide is positioned between the first signal electrode and the second signal electrode.

10. The optical control device according to claim 8,
wherein the second electrode includes a planar auxiliary electrode which is formed below the second signal electrode so as to be coupled with the second signal electrode.

11. The optical control device according to claim 8,
wherein the control electrode includes a third electrode which is maintained at potential ground potential and formed to be located in a lower portion of the second electrode.

12. The optical control device according to claim 8,
wherein a low dielectric constant film is filled in recesses which are disposed on at least both sides of the ridged waveguide.

13. The optical control device according to claim 8,
wherein a buffer layer is formed at least between the substrate and the first electrode.

14. The optical control device according to claim 8,
wherein in the first electrode and the second electrode, the signal electrode and the ground electrode are configured by either a transparent electrode or an electrode where a transparent electrode is disposed on the substrate.

15. The optical control device according to claim 8,
wherein a spontaneous polarization of the substrate including at least a portion of the optical waveguide is reversed.

* * * * *